(12) United States Patent
Lee et al.

(10) Patent No.: US 8,653,224 B1
(45) Date of Patent: Feb. 18, 2014

(54) RESIN COMPOSITION FOR MANUFACTURING THERMOPLASTIC POLYESTER RESIN BY USING GREEN CATALYST

(71) Applicant: Lotte Chemical Corporation, Seoul (KR)

(72) Inventors: Soomin Lee, Daejeon (KR); Sanghyun Park, Daejeon (KR); Joongeun Jung, Daejeon (KR); Kijeong Han, Daejeon (KR); Sungmin Hong, Daejeon (KR); Yunbae Kook, Daejeon (KR); Jeongsun Kim, Gyeongsangnam-do (KR)

(73) Assignee: Lotte Chemical Corporation, Seoul (KR)

( * ) Notice: Subject to any disclaimer, the term of this patent is extended or adjusted under 35 U.S.C. 154(b) by 0 days.

(21) Appl. No.: 13/762,758

(22) Filed: Feb. 8, 2013

(51) Int. Cl.
*C08G 63/02* (2006.01)
*C08G 63/00* (2006.01)

(52) U.S. Cl.
USPC ........... 528/272; 528/271; 528/279; 528/280; 528/283; 528/286

(58) Field of Classification Search
USPC .................. 528/272, 279, 280, 283, 286
See application file for complete search history.

(56) References Cited

U.S. PATENT DOCUMENTS

| | | | |
|---|---|---|---|
| 4,217,440 A | 8/1980 | Barkey et al. | |
| 5,744,571 A | 4/1998 | Hilbert et al. | |
| 6,143,837 A | 11/2000 | Al Ghatta et al. | |
| 6,787,630 B1 * | 9/2004 | Dominguez De Walter et al. | 528/279 |
| 7,199,210 B2 * | 4/2007 | Kulkarni et al. | 528/272 |
| 2002/0087027 A1 * | 7/2002 | Lindall et al. | 560/205 |
| 2007/0155947 A1 | 7/2007 | Fujimori et al. | |

OTHER PUBLICATIONS

Seidel et al. (Chemical Fibers International 1999 p. 6).*

* cited by examiner

*Primary Examiner* — Terressa Boykin
(74) *Attorney, Agent, or Firm* — Sherr & Jiang, PLLC

(57) ABSTRACT

Provided is a composition for manufacturing a polyester resin having a molar ratio of a diol compound to a dicarboxylic acid compound ranging from 1.05 to 1.4, in which the composition includes 5 ppm to 50 ppm of a phosphorous (P) compound (based on an amount of P), 10 ppm to 40 ppm of a cobalt (Co) compound (based on an amount of Co), 0.2 ppm to 20 ppm of a color enhancer, and 5 ppm to 25 ppm/3 ppm to 30 ppm of a titanium (Ti)-germanium (Ge) composite catalyst compound (based on an amount of Ti/Ge), based on weight percentage.

11 Claims, No Drawings

RESIN COMPOSITION FOR MANUFACTURING THERMOPLASTIC POLYESTER RESIN BY USING GREEN CATALYST

BACKGROUND OF THE INVENTION

1. Field of the Invention

The present invention relates to a composition for manufacturing a polyester resin, and more particularly, to a composition for manufacturing a polyester resin having excellent transparency, excellent color, and high inherent viscosity (I.V) suitable for molding containers.

2. Description of the Related Art

A polyester resin is one type of resins most frequently used in containers, sheets, films, fibers, and injection products, and antimony oxide or antimony triacetate is most commonly used as a catalyst during manufacturing thereof.

The antimony catalyst has advantages in that color is excellent and productivity is high due to high activity during esterification (ES) and polycondensation (P.C), but antimony is regulated as a material that is harmful to the human body due to its toxicity, and thus, there is a worldwide need to develop new catalysts that are safe to the human body and environmentally friendly. In Japan, polyester resins have been produced by using a germanium catalyst as an alternative to such limitations. However, since the price of the germanium catalyst may be ten times or more higher than that of the antimony catalyst, interests in a new catalyst that is inexpensive, harmless to the human body, and environmentally friendly have rapidly grown.

A titanium compound catalyst has been developed as an alternative to the antimony catalyst. However, there may be limitations in that a polyester resin prepared with the disclosed titanium catalyst may be not suitable for molding containers due to a yellowing phenomenon, productivity may not only be decreased due to a low reaction rate during a solid state polymerization reaction but a large amount of acetaldehyde may also be generated due to a high thermal decomposition rate in the process of forming molded products, such as containers, sheets, films, and fibers, and inherent viscosity (UV) is too low to be used as a resin for molding containers.

In order to address the foregoing limitations with respect to the titanium catalyst, a method of using titanium alkoxide, acetyl acetonate, dioxide, titanate, and phosphate, and using pyromellitic dianhydride for improving inherent viscosity during solid state polymerization is suggested as a method of manufacturing polyester by using a titanium compound catalyst in U.S. Pat. No. 6,143,837. However, information related to branching agents is limited and there may be no plan for improving color, the biggest limitation in preparing polyethylene terephthalate (hereinafter, referred to as "PET") by using a titanium catalyst compound.

Also, in U.S. Pat. No. 5,744,571, alkyl titanate is used as a titanium catalyst compound and various color enhancers for improving colors are suggested. However, a value of b among color values may be decreased by using an organic color agent and plans for improving a solid state polymerization rate and thermal stability may not be suggested.

Further, various methods for preparing branched polyester by using polyfunctional agents are suggested in U.S. Pat. No. 4,217,440. However, the purposes of the methods, as techniques developed before titanium catalysts are produced, may not be clear and there may be no method of improving colors and no technique able to improve a reaction rate of solid state polymerization, disadvantage of the titanium catalysts.

A method of adding a blue agent and a red agent as color agents for improving color values during preparation of PET by using a titanium catalyst compound and using pyromellitic dianhydride (PMDA) as a measure capable of improving a solid state polymerization rate is disclosed in U.S. Pat. No. 7,199,210. However, since this method uses organic color agents, there may be limitations for a fundamental color enhancer, and as a plane for improving the solid state polymerization rate, only PMDA is used as a polyfunctional agent and thus, it may be lack of diversity.

Also, a method of preparing polyester for improving a yellowing phenomenon, characteristics of a titanium catalyst, by using a titanium catalyst and a magnesium compound is disclosed in U.S. Patent Publication No. 2007/0155947. However, limitations occurred during the use of the titanium catalyst, such as the reduction of a solid state polymerization rate and the generation of a large amount of acetaldehyde caused by fast thermal decomposition, may not be improved.

SUMMARY OF THE INVENTION

The present invention provides a composition for manufacturing a polyester resin able to address limitations, such as a reaction rate during solid state polymerization, generation of acetaldehyde, inherent viscosity suitable for molding containers, and a yellowing phenomenon, as well as being harmless to the human body and environmentally friendly by using a green catalyst instead of antimony.

The present invention also provides a polyester resin particularly having the best color and inherent viscosity as well as low manufacturing costs during manufacturing of the polyester resin by using a new composite catalyst combined with optimum compositions of specific catalysts in applying a green catalyst.

According to an aspect of the present invention, a composition for manufacturing a polyester resin having a molar ratio of a diol compound to a dicarboxylic acid compound ranging from 1.05 to 1.4 is provided, wherein the composition comprises 5 ppm to 50 ppm of a phosphorous (P) compound (based on an amount of P), 10 ppm to 40 ppm of a cobalt (Co) compound (based on an amount of Co), 0.2 ppm to 20 ppm of a color enhancer, and 5 ppm to 25 ppm/3 ppm to 30 ppm of a titanium (Ti)-germanium (Ge) composite catalyst compound (based on an amount of Ti/Ge), based on weight percentage.

The composition for manufacturing a polyester resin according to the present invention may further include 10 ppm to 500 ppm of a branching agent.

In the composition for manufacturing a polyester resin according to the present invention, the branching agent may be one or more selected from the group consisting of trimellitic acid, trimellitic anhydride, pyromellitic acid, pyromellitic dianhydride, benzophenone-3,3',4,4'-tetracarboxylic acid dianhydride, 1,4,5,8-naphthalenetetracarboxylic acid dianhydride, 3,3',4,4'-biphenyltetracarboxylic acid dianhydride, diphenylsulfone tetracarboxylic acid dianhydride, cyclopentane tetracarboxylic acid dianhydride, pentaerythritol, tetrahydrofuran, tetracarboxylic acid dianhydride, hydroxy terephthalic acid, dihydroxy benzoic acid, 1,2,2'-ethane tricarboxylic acid, glycerol, and trimethylolpropane.

In the composition for manufacturing a polyester resin according to the present invention, the titanium-germanium composite catalyst compound may be formed by dissolving a mixture of a titanium precursor and a germanium precursor in ethylene glycol.

In the composition for manufacturing a polyester resin according to the present invention, the titanium precursor may be composite oxide of titanium dioxide ($TiO_2$) and silicon dioxide ($SiO_2$), and the germanium precursor is germanium dioxide ($GeO_2$).

In the composition for manufacturing a polyester resin according to the present invention, the dicarboxylic acid compound may be one or more selected from the group consisting of phthalic acid, terephthalic acid, isophthalic acid, dibromoisophthalic acid, sodium sulfbisophthalate, phenylenedioxy dicarboxylic acid, 4,4'-diphenyldicarboxylic acid, 4,4'-diphenyl ether dicarboxylic acid, 4,4'-diphenyl ketone dicarboxylic acid, 4,4'-diphenoxyethane dicarboxylic acid, 4,4'-diphenylsulfone dicarboxylic acid, and 2,6-naphthalenedicarboxylic acid.

In the composition for manufacturing a polyester resin according to the present invention, the dicarboxylic acid compound may be formed of 90 mol % to 100 mol % of the terephthalic acid and 0 mol % to 10 mol % of the isophthalic acid.

In the composition for manufacturing a polyester resin according to the present invention, the diol compound may be one or more selected from the group consisting of monoethylene glycol, diethylene glycol, 1,3-propylene diol, 1,4-butylene diol, 1,4-cyclohexanedimethanol, and neopentyl glycol.

In the composition for manufacturing a polyester resin according to the present invention, the cobalt compound may be cobalt acetate.

In the composition for manufacturing a polyester resin according to the present invention, the phosphorous compound may be one or more selected from the group consisting of phosphoric acid, trimethyl phosphate, triethyl phosphate, tri-n-butyl phosphate, trioctyl phosphate, triphenyl phosphate, tricresyl phosphate, methyl acid phosphate, ethyl acid phosphate, isopropyl phosphate, butyl acid phosphate, diethyl phosphate, monobutyl phosphate, dibutyl phosphate, dioctyl phosphate, and triethylene glycol acid phosphate.

In the composition for manufacturing a polyester resin according to the present invention, the color enhancer may be a blue dye agent or a red dye agent.

According to another aspect of the present invention, a polyester resin manufactured by using the composition is provided, wherein a value of color coordinate L is 75.0 or more, a value of color coordinate b is 0.0 or less, and inherent viscosity (I.V) is in a range of 0.70 dl/g to 0.9 dl/g.

DETAILED DESCRIPTION OF THE INVENTION

Hereinafter, the present invention will be described in detail according to specific examples. Before describing the present invention, it will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Accordingly, since the embodiments set forth in the present specification is shown by way of example and does not represent all the technological spirit of the present invention, it should be understood that embodiments of the present invention are capable of various modifications, equivalents, and alternatives at the time of present application.

The present invention provides a composition for manufacturing a polyester resin having a molar ratio of a diol compound to a dicarboxylic acid compound ranging from 1.05 to 1.4, in which the composition includes 5 ppm to 50 ppm of a phosphorous (P) compound (based on an amount of P), 10 ppm to 40 ppm of a cobalt (Co) compound (based on an amount of Co), 0.2 ppm to 20 ppm of a color enhancer, and 5 ppm to 25 ppm/3 ppm to 30 ppm of a titanium (Ti)-germanium (Ge) composite catalyst compound (based on an amount of Ti/Ge), based on weight percentage, and the present invention may provide a composition for manufacturing a polyester resin further including 10 ppm to 500 ppm of a branching agent.

The present invention may address limitations generated by using a titanium catalyst compound during typical preparation of a polyester resin, such as a yellowing phenomenon of resin color, a solid state polymerization rate, a poor color coordinate due to thermal decomposition during preparation of molded products by using the prepared polyester resin, generation of acetaldehyde, and a decrease in transparency, by suggesting combination and optimum contents of components further including the branching agent in addition to the phosphorous compound, the cobalt compound, the color enhancer, and the titanium-germanium composite catalyst compound. Hereinafter, each component of the present invention will be described in detail.

The composition for manufacturing a polyester resin according to the present invention is composed of a dicarboxylic acid compound and a diol compound as main raw materials.

The dicarboxylic acid compound includes aromatic molecules as a main component among diacid compounds. In the present invention, phthalic acid, terephthalic acid, isophthalic acid, dibromoisophthalic acid, sodium sulfoisophthalate, phenylenedioxy dicarboxylic acid, 4,4'-diphenyldicarboxylic acid, 4,4'-diphenyl ether dicarboxylic acid, 4,4'-diphenyl ketone dicarboxylic acid, 4,4'-diphenoxyethane dicarboxylic acid, 4,4'-diphenylsulfone dicarboxylic acid, and 2,6-naphthalenedicarboxylic acid may be used non-restrictively, and for example, a mixture of terephthalic acid and/or other dicarboxylic acid compounds may be used. In the case that the mixture is used, a content of the terephthalic acid may be at least 90 mol % of the total dicarboxylic acid compound, may be 95 mol % or more, and for example, may be 99 mol % or more. The most preferred composition of the mixture is a mixture of terephthalic acid and isophthalic acid.

Non-restrictive examples of the diol compound may be monoethylene glycol, diethylene glycol, 1,3-propylene diol, 1,4-butylene diol, 1,4-cyclohexanedimethanol, and neopentyl glycol, and for example, monoethylene glycol alone and a mixture of monoethylene glycol or diethylene glycol and/or other diol compounds may be used. In the case that the mixture is used, a content of the monoethylene glycol or diethylene glycol may be at least 95 mol % of the total diol compound, and for example, may be 98 mol % or more. The most preferred composition of mixture is a mixture of monoethylene glycol or diethylene glycol and neopentyl glycol.

In the present invention, a content ratio of the diol compound to the dicarboxylic acid is in a range of 1.05 to 1.4 based on a molar ratio. At this time, the content ratio may be in a range of 1.1 to 1.3, in order to improve color and inherent viscosity of the composition for manufacturing a polyester resin and prevent deterioration of physical properties of a prepolymer.

In the present invention, the phosphorous compound is used as a thermal stabilizer for preventing changes in physical and chemical properties of the resin caused by heat and is included in an amount of 5 ppm to 50 ppm (based on an amount of P) based on a total weight of the polyester resin composition finally manufactured. The phosphorous compound may be included in an amount of 25 ppm to 35 ppm. In the case that the content of the phosphorous compound is less than 5 ppm, thermal stability may be decreased and yellowing may occur, and in the case in which the content thereof is greater than 50 ppm, it may be unfavorable in terms of manufacturing costs and the phosphorous compound may rather unfavorably act on a reaction by generating fume during polycondensation.

Non-restrictive examples of the phosphorous compound may be phosphoric acid, trimethyl phosphate, triethyl phosphate, tri-n-butyl phosphate, trioctyl phosphate, triphenyl phosphate, tricresyl phosphate, methyl acid phosphate, ethyl acid phosphate, isopropyl phosphate, butyl acid phosphate, diethyl phosphate, monobutyl phosphate, dibutyl phosphate, dioctyl phosphate, and triethylene glycol acid phosphate, and phosphoric acid, triethyl phosphate, and ethyl acid phosphate may be used and for example, triethyl phosphate may be used.

In the present invention, the cobalt compound acts as a colorant for improving color during the manufacturing of a polyester resin and is included in an amount of 10 ppm to 40 ppm (based on an amount of Co) based on the total weight of the polyester resin composition finally manufactured. The cobalt compound may be included in an amount of 25 ppm to 35 ppm. In the case that the content of the cobalt compound is less than 5 ppm, a value of color b may be increased (a type of colorants/cocatalysts), and in the case in which the content thereof is greater than 40 ppm, it may be unfavorable in terms of manufacturing costs and color L and color b may be rather darken.

Although it is not restrictive, cobalt acetate may be used as the cobalt compound.

In the present invention, the color enhancer is used for improving color of containers molded by using the polyester resin, and is included in an amount of 0.2 ppm to 20 ppm based on the total weight of the polyester resin composition finally manufactured. The color enhancer may be included in an amount of 5 ppm to 15 ppm. In the case that the content of the color enhancer is less than 0.2 ppm, an effect that of improving color may be insignificant, and in the case that the content thereof is greater than 20 ppm, color may be somewhat darken.

Although it is not restrictive, a blue dye agent or a red dye agent may be used as the color enhancer.

In the present invention, the branching agent acts to improve physical properties of a resin prepared during solid state polymerization and may be included in an amount of 10 ppm to 500 ppm based on the total weight of the polyester resin composition finally manufactured. The branching agent may be included in an amount of 30 ppm to 300 ppm, and for example, may be included in an amount of 50 ppm to 150 ppm. In the case that the content of the branching agent is less than 10 ppm, a degree of an increase in inherent viscosity of the manufactured resin may be insignificant, and in the case that the content thereof is greater than 500 ppm, color may be rather darken.

Non-restrictive examples of the branching agent may be trimellitic acid (TMLA), trimellitic anhydride (TMA), pyromellitic acid (PMLA), pyromellitic dianhydride (PMDA), benzophenone-3,3',4,4'-tetracarboxylic acid dianhydride, 1,4,5,8-naphthalenetetracarboxylic acid dianhydride, 3,3',4,4'-biphenyltetracarboxylic acid dianhydride, diphenylsulfone tetracarboxylic acid dianhydride, cyclopentane tetracarboxylic acid dianhydride, pentaerythritol, tetrahydrofuran, tetracarboxylic acid dianhydride, hydroxy terephthalic acid, dihydroxy benzoic acid, 1,2,2'-ethane tricarboxylic acid, glycerol, and trimethylolpropane, and trimellitic acid, trimellitic anhydride, pyromellitic acid, or pyromellitic dianhydride may be used, and for example, trimellitic acid or trimellitic anhydride may be used.

A titanium-germanium composite catalyst compound is used as a catalyst used during the manufacturing of the composition for manufacturing a polyester resin according to the present invention, different from only using a typical titanium catalyst compound.

Meanwhile, in the present invention, the titanium-germanium composite catalyst compound is used in order to further improve a yellowing phenomenon of polymers and a decrease in productivity due to no increase in viscosity during solid state polymerization, which occurred when a typical titanium catalyst compound is used alone in the composition for manufacturing a polyester resin.

A solution formed by dissolving a mixture of a titanium precursor and a germanium precursor in ethylene glycol may be used as the titanium-germanium composite catalyst compound. At this time, a mixing ratio of the titanium precursor and the germanium precursor is controlled to be in a range of 5 ppm to 25 ppm/3 ppm to 30 ppm (based on an amount of Ti/Ge) based on the total weight of the polyester resin composition finally manufactured. Composite oxide of titanium dioxide ($TiO_2$)/silicon dioxide ($SiO_2$) may be used as the titanium precursor and germanium dioxide ($GeO_2$) may be used as the germanium precursor.

In the present invention, the titanium-germanium composite catalyst compound is included in an amount of 5 ppm to 25 ppm/3 ppm to 30 ppm (based on an amount of Ti/Ge) based on the total weight of the polyester resin composition finally manufactured. The titanium-germanium composite catalyst compound may be included in an amount of 5 ppm to 15 ppm/10 ppm to 20 ppm, and for example, may be included in an amount of 8 ppm to 12 ppm/12 ppm to 16 ppm. The foregoing contents of the titanium-germanium composite catalyst compound are the results obtained by identifying a range having the best degree of improving color and inherent viscosity of the polyester resin prepared with the composition for manufacturing a polyester resin according to the present invention. Specifically, in the case that the content of titanium is less than 5 ppm and the content of germanium is less than 3 ppm, a reaction may not occur or may be slow, and in the case in which the content of titanium is greater than 25 ppm and the content of germanium is greater than 30 ppm, color of the polymer may not be good due to high activity of the titanium and germanium catalysts.

The composition for manufacturing a polyester resin according to the present invention may further include an antioxidant, an ultraviolet blocking agent, an antistatic agent, a flame retardant, and a surfactant, if necessary.

A method of manufacturing a polyester resin by using the composition for manufacturing a polyester resin according to the present invention may be based on a method known in the art to which the present invention pertains, and the method is not particularly limited. For example, the polymer resin may be manufactured through the following method by using a batch-type reactor. The method may be continuously performed and is not particularly limited.

That is, the method of manufacturing a polyester resin by using the composition for manufacturing a polyester resin according to the present invention may include the steps of: (A) mixing quantified dicarboxylic acid compound and diol compound to prepare a slurry; (B) performing esterification after adding a titanium-germanium composite catalyst compound and a branching agent to the slurry; (C) adding a phosphorous compound, a cobalt compound, and a color enhancer after the esterification to prepare a polymer; (D) performing polycondensation of the polymer; (E) discharging a reactant formed by the polycondensation to prepare melt chips; and (F) crystallizing the melt chips to perform solid state polymerization.

Herein, the titanium-germanium composite catalyst compound may be added between step (A) or step (B) and step (C).

Also, additives, such as the phosphorous compound, the cobalt compound, and the color enhancer, may be added in step (A).

Another example of the method of manufacturing a polyester resin of the present invention will be described in more detail. First, dicarboxylic acid and diol as main components, and additives, such as a catalyst, are added into a prepared stirrer and stirred to prepare a slurry, a mixture is then transferred to an esterification reactor, esterification is performed at least up to 80% or more, for example, 90% or more, other additives, such as a thermal stabilizer, are then added, and a mixture is transferred to a polycondensation reactor to perform polycondensation. Thereafter, the polycondensation is performed to obtain a degree of polymerization of 100 or more and cutting is then performed in water to prepare melt chips having an inherent viscosity ranging from 0.5 dl/g to 0.7 dl/g. The melt chips after cutting are transferred to a solid state polymerization reactor and a polyester resin for molding containers having an inherent viscosity ranging from 0.7 dl/g to 0.9 dl/g may be manufactured.

Also, the esterification may be performed by stirring for about 1 to 10 hours under the condition of a temperature ranging from 220° C. to 290° C., for example, 245° C. to 265° C., and a pressure ranging from 0.1 kg/cm$^2$ to 5 kg/cm$^2$, for example, 0.5 kg/cm$^2$ to 3 kg/cm$^2$. At this time, water generated during the esterification may be removed immediately.

The polycondensation may be performed by stirring for about 1 to 20 hours under the condition of a temperature ranging from 250° C. to 300° C., for example, 270° C. to 290° C., and a reduced pressure ranging from 0.1 torr to 5 ton, for example, 0.5 torr to 2 torr. At this time, ethylene glycol and byproducts generated during the polycondensation may be removed immediately.

Similar to the foregoing method, the catalyst compound, the phosphorous compound, the cobalt compound, the color enhancer, and the branching agent may be added in the step of preparing a slurry and any step of after the esterification or before the polycondensation. However, the branching agent may be added to the slurry with respect to an acid compound, and, with respect to an anhydride compound, may be added after the esterification or before the polycondensation.

The solid state polymerization may be performed under the condition of a temperature ranging from 195° C. to 230° C. and a reduced pressure ranging from 0.2 torr to 2 torr in a nitrogen atmosphere.

The composition for manufacturing a polyester resin according to the present invention and the polyester resin manufactured according to the method of manufacturing a polyester resin exhibit physical properties including a value of color coordinate L of 75.0 or more, a value of color coordinate b of 0.0 or less, and an inherent viscosity (I.V) ranging from 0.70 dl/g to 0.9 dl/g, and thus, are particularly suitable for molding containers. Herein, the value of color coordinate L is an index representing brightness of the resin, i.e., how bright the sample is, and the value of color coordinate b represents a degree of yellowing of the resin. When the value of L is high, the resin is bright, and when the value of b is high, the resin becomes yellowish. When both values are low (particularly, "–" values), the resin has blue tone.

Also, examples of the polyester resin may be polyethylene terephthalate (PET), polybutylene terephthalate (PBT), glycol modified polyester (PETG), polyethylene naphthalate (PEN), polypropylene terephthalate (PPT), and polytrimethylene terephthalate (PTT), but the polyester resin is not limited thereto.

Hereinafter, the present invention will be described in more detail according to specific manufacturing examples, examples, and comparative examples.

Manufacturing Example

A batch-type polymerization reactor was used as a melt polymerization reactor used for manufacturing a polyester resin, and a reactor including one esterification reactor, one polycondensation reactor, and a cutting system was included. Esterification and polycondensation were respectively performed for 3 to 4 hours and for 2 to 3 hours, and a polyester resin was manufactured by increasing a temperature to 285° C. while reduced pressure was decreased to obtain a final pressure of 1.0 torr or less. Also, a batch-type reactor was used as a solid state polymerization reactor, in which solid state polymerization was performed at a reaction temperature of 225° C. and a pressure of 0.4 torr or less for 10 hours.

Example 1

A diol compound formed of 100 mol % monoethylene glycol was added to a dicarboxylic acid compound formed of 97 mol % of terephthalic acid and 3 mol % of isophthalic acid, as main raw materials, at a molar ratio of 1.2. A polyester resin was manufactured by respectively weighing 30 ppm of a phosphorous compound (triethyl phosphate), 30 ppm of a cobalt compound (cobalt acetate), 6.1 ppm of a blue dye agent (Global PRT, ColorMatrix Corporation), 4.0 ppm of a red dye agent (Global PRT, ColorMatrix Corporation), and 10 ppm/ 14 ppm of a titanium-germanium composite catalyst compound (prepared by dissolving titanium dioxide/silicon dioxide composite oxide (C-94, Sachtleben GmBH, Germany) and germanium dioxide in ethylene glycol) and adding in the step of preparing a slurry.

Example 2

A polyester resin was manufactured in the same manner as Example 1 except that 100 ppm of a branching agent (pyromellitic dianhydride) was further added in Example 1.

Comparative Example 1

A polyester resin was manufactured in the same manner as Example 1 except that 13 ppm of a titanium catalyst compound was added instead of the titanium-germanium composite compound, and the blue dye agent and the red dye agent were not added in Example 1. Herein, a titanium chelate compound (chelate compound prepared from tetraisopropyl titanate and amino carboxylic acid) known as a compound having the best activity was used as the titanium catalyst compound and this was the same as in the following comparative examples.

Comparative Example 2

A polyester resin was manufactured in the same manner as Example 1 except that 13 ppm of the titanium catalyst compound was added instead of the titanium-germanium composite compound, and 0.7 ppm of the blue dye agent and 0.5 ppm of the red dye agent were added in Example 1.

Comparative Example 3

A polyester resin was manufactured in the same manner as Example 1 except that 13 ppm of the titanium catalyst compound was added instead of the titanium-germanium composite compound, and 1.2 ppm of the blue dye agent, 0.7 ppm of the red dye agent, and 100 ppm of a branching agent (pyromellitic dianhydride) were further added in Example 1.

Comparative Example 4

A polyester resin was manufactured in the same manner as Example 1 except that 13 ppm of a titanium catalyst compound was added instead of the titanium-germanium composite compound in Example 1.

Comparative Example 5

A polyester resin was manufactured in the same manner as Example 1 except that the titanium-germanium composite compound, the blue dye agent, and the red dye agent were not added and 230 ppm of an antimony catalyst compound (antimony oxide) was added in Example 1.

Comparative Example 6

A polyester resin was manufactured in the same manner as Example 1 except that 13 ppm of the titanium catalyst compound was added instead of the titanium-germanium composite compound, and 1.2 ppm of the blue dye agent and 0.7 ppm of the red dye agent were added in Example 1.

Comparative Example 7

A polyester resin was manufactured in the same manner as Example 1 except that 13 ppm of the titanium catalyst compound was added instead of the titanium-germanium composite compound, and 1.2 ppm of the blue dye agent, 0.7 ppm of the red dye agent, and 50 ppm of a branching agent (pyromellitic dianhydride) were further added in Example 1.

Contents (unit: ppm) of the additives except the dicarboxylic acid compound and the diol compound in the polyester resins manufactured according to the examples and the comparative examples are listed in the following Table 1.

TABLE 1

| Category | Example 1 | Example 2 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| Sb | — | — | — | — | — | — | 230 | — | — |
| Ti | — | — | 13 | 13 | 13 | 13 | — | 13 | 13 |
| Ti/Ge | 10/14 | 10/14 | — | — | — | — | — | — | — |
| Blue | 6.1 | 6.1 | — | 0.7 | 1.2 | 6.1 | — | 1.2 | 1.2 |
| Red | 4 | 4 | — | 0.5 | 0.7 | 4 | — | 0.7 | 0.7 |
| Branching agent | — | 100 | — | — | 100 | — | — | — | 50 |
| TEP | 30 | 30 | 30 | 30 | 30 | 30 | 30 | 30 | 30 |
| CoAc | 30 | 30 | 30 | 30 | 30 | 30 | 30 | 30 | 30 |

Notes
Sb antimony catalyst compound
Ti titanium catalyst compound
Ti/Ge titanium-germanium composite catalyst compound
Blue blue dye agent
Red red dye agent
TEP triethyl phosphate
CoAc cobalt acetate Experimental Example Inherent viscosity, color L, color a, and color b were measured for melt chips and solid chips prepared according to the examples and the comparative examples, and the results of physical properties thereof and the results of evaluation of process characteristics are summarized in the following Table 2. The process characteristics were evaluated by comprehensive review of the results of inherent viscosity and color properties

TABLE 2

| Category | | Example 1 | Example 2 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|
| Melt chip properties | I.V | 0.595 | 0.595 | 0.599 | 0.649 | 0.603 | 0.591 | 0.601 | 0.603 | 0.603 |
| | Color L | 59.4 | 59.4 | 55.6 | 59.7 | 57.4 | 56.5 | 60.7 | 57.4 | 57.4 |
| | Color a | 1.73 | 1.73 | 0.8 | −0.5 | 0.3 | 0.68 | 0.89 | 0.3 | 0.3 |
| | Color b | −2.7 | −2.7 | 4 | 1.2 | −1.5 | −0.55 | −1.72 | −1.5 | −1.5 |
| Solid chip properties | I.V | 0.741 | 0.82 | 0.71 | 0.744 | 0.841 | 0.739 | 0.794 | 0.734 | 0.783 |
| | Color L | 81.7 | 80.5 | 76.9 | 79.2 | 78.7 | 78.9 | 82.3 | 79.1 | 78.8 |
| | Color a | 0.47 | 0.29 | −0.15 | −1.5 | −0.13 | −0.62 | −0.35 | −0.9 | −0.31 |
| | Color b | −3.95 | −3.21 | 3.8 | 0.5 | 0.32 | −0.88 | −2.12 | −0.42 | 0.19 |

TABLE 2-continued

| Category | Example 1 | Example 2 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| Evaluation of process characteristics | ◎ | ◎ | X | Δ | Δ | Δ | ◎ | Δ | Δ |

Notes
◎ very good,
O good,
Δ normal,
X poor

Referring to Table 2, in the case that the titanium-germanium composite catalyst compound, the color enhancer, the phosphorous compound, and the cobalt compound were included (Example 1) and in the case that the branching agent was further added thereto (Example 2), it may be understood that optimum compositions were obtained in which inherent viscosities and values of color L and color b of the melt chips and the solid chips were all suitable for molding containers. At this time, it may be understood that inherent viscosity may be further improved by adding the branching agent.

In contrast, in the case that only the titanium catalyst compound corresponding to the catalyst compound of the examples was used as a catalyst compound and other additives except the phosphorous compound and the cobalt compound were not added (Comparative Example 1), it may be understood that color L, color b, and inherent viscosity of the solid chips were decreased. Also, in the case that the color enhancer having the same content as that of the examples was further added (Comparative Example 4), it may be understood that color L and color b were decreased in comparison to the examples, and in the case that the branching agent was further added (Comparative Examples 3 and 7), it may be understood that inherent viscosity was increased, but color properties were also deteriorated in comparison to the examples. Further, in the case that only the titanium catalyst compound corresponding to the catalyst compound of the examples was used as a catalyst compound and the content of the color enhancer was somewhat low (Comparative Examples 2 and 6), it may be understood that color b was decreased.

Meanwhile, in the case that only the antimony compound was used as a catalyst compound (Comparative Example 5), excellent physical properties were overall exhibited, but, as described above, it is not favorable in terms of environmental friendliness.

As described above, with respect to a polyester resin manufactured by using the composition for manufacturing a polyester resin according to the present invention, excellent inherent viscosity, color L, and color b may be obtained by using a titanium-germanium composite catalyst compound along with a titanium catalyst compound in comparison to the case in which only a typical titanium catalyst compound is used. Thus, the polyester resin according to the present invention may further compliment yellowing of polyester chips and molded products, disadvantages of a typical titanium catalyst compound, while being harmless to the human body and environmentally friendly, and may further improve a phenomenon of decreasing a solid state polymerization rate, another disadvantage thereof.

In manufacturing of a polyester resin for molding containers by using the composition of the present invention, since the composition for manufacturing a polyester resin according to the present invention has high inherent viscosity in comparison to the case of using a typical titanium catalyst compound while being harmless to the human body and environmentally friendly, a composition for manufacturing a polyester resin able to improve a reaction rate during solid state polymerization and decrease the generation of acetaldehyde caused by thermal decomposition may be provided.

Also, since a titanium-germanium composite catalyst compound having an optimum composition is used in the application of a green catalyst, a value of color coordinate more improved in comparison to the case of using a typical titanium catalyst compound may be maintained, and thus, a polyester resin having an improved yellowing phenomenon as well as being economical may be provided.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A composition for manufacturing a polyester resin having a molar ratio of a diol compound to a dicarboxylic acid compound ranging from 1.05 to 1.4,
wherein the composition comprises 5 ppm to 50 ppm of a phosphorous (P) compound (based on an amount of P), 10 ppm to 40 ppm of a cobalt (Co) compound (based on an amount of Co), 0.2 ppm to 20 ppm of a color enhancer, and 8 ppm to 15 ppm/3 ppm to 16 ppm of a titanium (Ti)-germanium (Ge) composite catalyst compound (based on an amount of Ti/Ge), based on weight percentage,
wherein a value of color coordinate L is 75.0 or more, a value of color coordinate b is 0.0 or less, and inherent viscosity (I.V) is in a range of 0.70 dl/g to 0.9 dl/g.

2. The composition for manufacturing a polyester resin of claim 1, wherein the composition for manufacturing a polyester resin further comprises 10 ppm to 500 ppm of a branching agent.

3. The composition for manufacturing a polyester resin of claim 2, wherein the branching agent is one or more selected from the group consisting of trimellitic acid, trimellitic anhydride, pyromellitic acid, pyromellitic dianhydride, benzophenone-3,3',4,4'-tetracarboxylic acid dianhydride, 1,4,5,8-naphthalenetetracarboxylic acid dianhydride, 3,3',4,4'-biphenyltetracarboxylic acid dianhydride, diphenylsulfone tetracarboxylic acid dianhydride, cyclopentane tetracarboxylic acid dianhydride, pentaerythritol, tetrahydrofuran, tetracarboxylic acid dianhydride, hydroxy terephthalic acid, dihydroxy benzoic acid, 1,2,2'-ethane tricarboxylic acid, glycerol, and trimethylolpropane.

4. The composition for manufacturing a polyester resin of claim 1, wherein the titanium-germanium composite catalyst compound is formed by dissolving a mixture of a titanium precursor and a germanium precursor in ethylene glycol.

5. The composition for manufacturing a polyester resin of claim 4, wherein the titanium precursor is composite oxide of titanium dioxide ($TiO_2$) and silicon dioxide ($SiO_2$), and the germanium precursor is germanium dioxide ($GeO_2$).

6. The composition for manufacturing a polyester resin of claim 1, wherein the dicarboxylic acid compound is one or more selected from the group consisting of phthalic acid, terephthalic acid, isophthalic acid, dibromoisophthalic acid, sodium sulfoisophthalate, phenylenedioxy dicarboxylic acid, 4,4'-diphenyldicarboxylic acid, 4,4'-diphenyl ether dicarboxylic acid, 4,4'-diphenyl ketone dicarboxylic acid, 4,4'-diphenoxyethane dicarboxylic acid, 4,4'-diphenylsulfone dicarboxylic acid, and 2,6-naphthalenedicarboxylic acid.

7. The composition for manufacturing a polyester resin of claim 6, wherein the dicarboxylic acid compound is formed of 90 mol % to 100 mol % of the terephthalic acid and 0 mol % to 10 mol % of the isophthalic acid.

8. The composition for manufacturing a polyester resin of claim 1, wherein the diol compound is one or more selected from the group consisting of monoethylene glycol, diethylene glycol, 1,3-propylene diol, 1,4-butylene diol, 1,4-cyclohexanedimethanol, and neopentyl glycol.

9. The composition for manufacturing a polyester resin of claim 1, wherein the cobalt compound is cobalt acetate.

10. The composition for manufacturing a polyester resin of claim 1, wherein the phosphorous compound is one or more selected from the group consisting of phosphoric acid, trimethyl phosphate, triethyl phosphate, tri-n-butyl phosphate, trioctyl phosphate, triphenyl phosphate, tricresyl phosphate, methyl acid phosphate, ethyl acid phosphate, isopropyl phosphate, butyl acid phosphate, diethyl phosphate, monobutyl phosphate, dibutyl phosphate, dioctyl phosphate, and triethylene glycol acid phosphate.

11. The composition for manufacturing a polyester resin of claim 1, wherein the color enhancer is a blue dye agent or a red dye agent.

* * * * *